United States Patent [19]

Skovhauge et al.

[11] Patent Number: 4,655,127
[45] Date of Patent: Apr. 7, 1987

[54] APPARATUS FOR PRODUCING ACID AND HEAT COAGULATED TYPES OF CHEESE

[75] Inventors: Erik Skovhauge, Vejlø O; Karl Simonsen, Randers, both of Denmark

[73] Assignee: Pasilac A/S, Denmark

[21] Appl. No.: 718,451

[22] Filed: Apr. 1, 1985

[30] Foreign Application Priority Data

Aug. 10, 1984 [DK] Denmark .............................. 3879/84

[51] Int. Cl.⁴ ........................ A01J 25/00; A23C 19/00
[52] U.S. Cl. ........................................ 99/455; 99/459; 99/460
[58] Field of Search ...................... 426/582, 36, 39, 40, 426/130; 99/452, 453, 455, 456–458, 460, 461

[56] References Cited

U.S. PATENT DOCUMENTS 3,732,110  5/1973  Pontecorvo .
3,780,199  12/1973  Carswell .
3,889,004  6/1975  Schmidt et al. .
3,899,595  8/1975  Stenne .
4,020,186  4/1977  Edwards .

FOREIGN PATENT DOCUMENTS

2098/83  8/1983  Denmark .
1424175  2/1976  United Kingdom .

OTHER PUBLICATIONS

CMT de Thomatis S & C s.a.s.: "Continuous Ricotta Extractor", Mod. T1 E T2.
J. L. Maubois et al, Journal of Dairy Science, vol. 61, No. 7, 1978, "Making Ricotta Cheese by Ultrafiltration", pp. 881–884.
Josef Calabro, "The New Continuous and Automated Process for Making Ricotta Cheese", Paper No. 198-6, The Marshall International Cheese Conference, 1980.
H. Wayne Modler, "Continuous Ricotta Manufacture", Modern Dairy, Jul./Aug. 1984, pp. 10–12.

*Primary Examiner*—Timothy F. Simone
*Attorney, Agent, or Firm*—Lowe, Price, LeBlanc, Becker & Shur

[57] ABSTRACT

Acid and heat coagulated types of cheese such as Ricotta, Mitzithra, and Galotiri as well as cottage cheese are produced from milk and/or whey starting materials, pasteurizing the starting materials followed by cooling and membrane filtration of the starting materials to form a retentate, whereafter the retentate is subjected to a heating and an acidification under pressure, and then to a sudden pressure drop, followed by cooling, agitation, and packaging, and finally to a secondary cooling, wherein the retentate is initially continuously heated to the precipitation temperature and then coagulant is added continuously under pressure to acidification to form a mixture, and the mixture is subjected to a sudden drop of pressure.

3 Claims, 2 Drawing Figures

APPARATUS FOR PRODUCING ACID AND HEAT COAGULATED TYPES OF CHEESE

BCKGROUND OF THE INVENTION

The present invention relates to a novel method for producing acid and heat coagulated types of cheese by treating milk and/or whey starting materials, comprising admixing the starting materials, pasteurizing the mixture, then cooling and membrane filterting the mixture, whereafter the retentate is subjected to heating and acidification and subsequently, by known methods and without back-pressure, is subjected to cooling, agitation, and packaging, and finally to secondary cooling.

More particularly, the present invention relates to a novel method for producing acid and heat coagulated types of cheese such as Ricotta, Mitzithra, and Galotiri as well as cottage cheese. The system for carrying out the method includes a closed system allowing the establishment of continuous process lines.

DESCRIPTION OF THE PRIOR ART

Cheese of the above types coagulated by acidification and heating were previously made from milk and/or whey by acidification followed by heating whereby the proteins are denatured and then float. The cheese precipitated in this manner is skimmed off by hand ladling and is usually subjected to an additional draining-off before packaging. This traditional method involves a considerable amount of manual work under unpleasant conditions. Another draw-back is the risk of waste of products during the manual handling of the cheese curd. In addition, this traditional method involves a relatively high energy consumption when heating to the precipitation temperature.

Continuous methods and process lines have been developed which to some extent overcome the drawbacks.

CMT de Thomatis S & C s.a.s.: "Continuous Ricotta Extractor" discloses a continuous, automatic Ricotta extraction allowing selection of temperature and acidity in order to obtain the desired product properties. The treatment comprises removing hot whey of a suitable temperature to the extractor, where its pH is adjusted. The whey is then fed to the extraction tub, where it is heated to the temperature required for albumin coagulation. The quality of the resulting product is stated to be more uniform than with manual extraction. A disadvantage of this known system is, however, that the method produces the traditional, large quantity of whey and consequently involves a high energy consumption for heating.

Journal of Dairy Science, Vol. 61, No. 7, 1978 "Making Ricotta Cheese by Ultrafiltration" by J. L. Maubois and F. V. Kosikowski, discloses the principles of an ultrafiltration process employed in the production of Ricotta cheese. It is stated that the method lends itself to continuous operation and produces cheese of a quality similar to traditionally produced Ricotta cheeses. By the described method, an acidification is carried out before heating. It is, however, doubtful whether in practice the method actually lends itself to continuous operation.

At a conference in the United States in 1980, at the Marshall International Cheese Conference (MICC), Madison, Wis., Mr. Josef Calabro gave a lecture entitled: "The New Continuous and Automated Process for Making Ricotta Cheese". The process described and the equipment used for said process were indicated to be particularly well-suited for making Ricotta cheese, and the process is labor-saving compared to the traditional manual process for making Ricotta cheese. Practice has, however, shown that the resulting product does not possess the proper structure, texture, and taste as it is too soft and sandy, and has an atypical taste.

U.S. Pat. No. 3,780,199 discloses the manufacture of Ricotta cheese. It is evident from the specification that ultrafiltration is not involved, and that an addition of acid takes place before coagulating by heating.

U.S. Pat. No. 3,732,110 also discloses a process for producing Ricotta cheese. This process does not involve ultrafiltration. Also, this process does not conform itself to continuously operating process lines. Furthermore, this reference also discloses an acidification step before the heating step.

U.S. Pat. No. 4,020,186 discloses a further method for manufacture of Ricotta cheese. This reference also does not involve an ultrafiltration step, and the method does not conform to a continuously operating process line for the manufacture of Ricotta cheese. It should be further noted that acidification is also used before heat coagulation in this process.

Danish Patent Application No. 2098/83 discloses a system for producing cheese. It is a system for automating a traditional batchwise production technique.

SUMMARY OF THE INVENTION

Accordingly the object of the present invention is to avoid the above demonstrated shortcomings of the various known techniques, i.e., a high energy consumption, low storage stability and poor value of the end product, inconvenient working environments such as working over open boilers, excessive waste in connection with curd removal by screens (cloth), insufficient biological storage qualities, as well as the lack of possibility of continuous operation of the process.

The above objects are accomplished by the method according to the invention. Thus, the present invention comprises a process for subjecting milk and/or whey starting materials to pasteurization, then cooling and filtration through a membrane to form a retentate, initially heating said retentate to the precipitation temperature and then continuously adding coagulant under pressure to acidification and mixing the resulting mixture comprising the retentate and the coagulant by subjecting said mixture to a sudden drop of pressure, cooling the resulting mixture in a primary cooling step, packaging to form a packaged product, and subjecting the packaged product to secondary cooling to provide the product. The method of the invention is carried out using an apparatus or system comprising a mixer, a heat exchanger for pasteurization and cooling, a membrane filtration apparatus, a piping system connected thereto, on the last length of which piping system is provided a cooling device, followed by a filling machine and a packing device, which system is characterized in that the piping system between the membrane filtration apparatus and the cooling device is provided with a heat exchanger, a dosing means for the coagulant, a manometer, and a back-pressure regulator which is placed as an insert in the piping system and causes the desired sudden drop of pressure.

BRIEF DESCRIPTION OF THE DRAWING

The method and the system according to the invention will become more apparent from the accompanying drawings wherein.

DESCRIPTION OF THE PREFERRED EMBODIMENT

Figure 1:
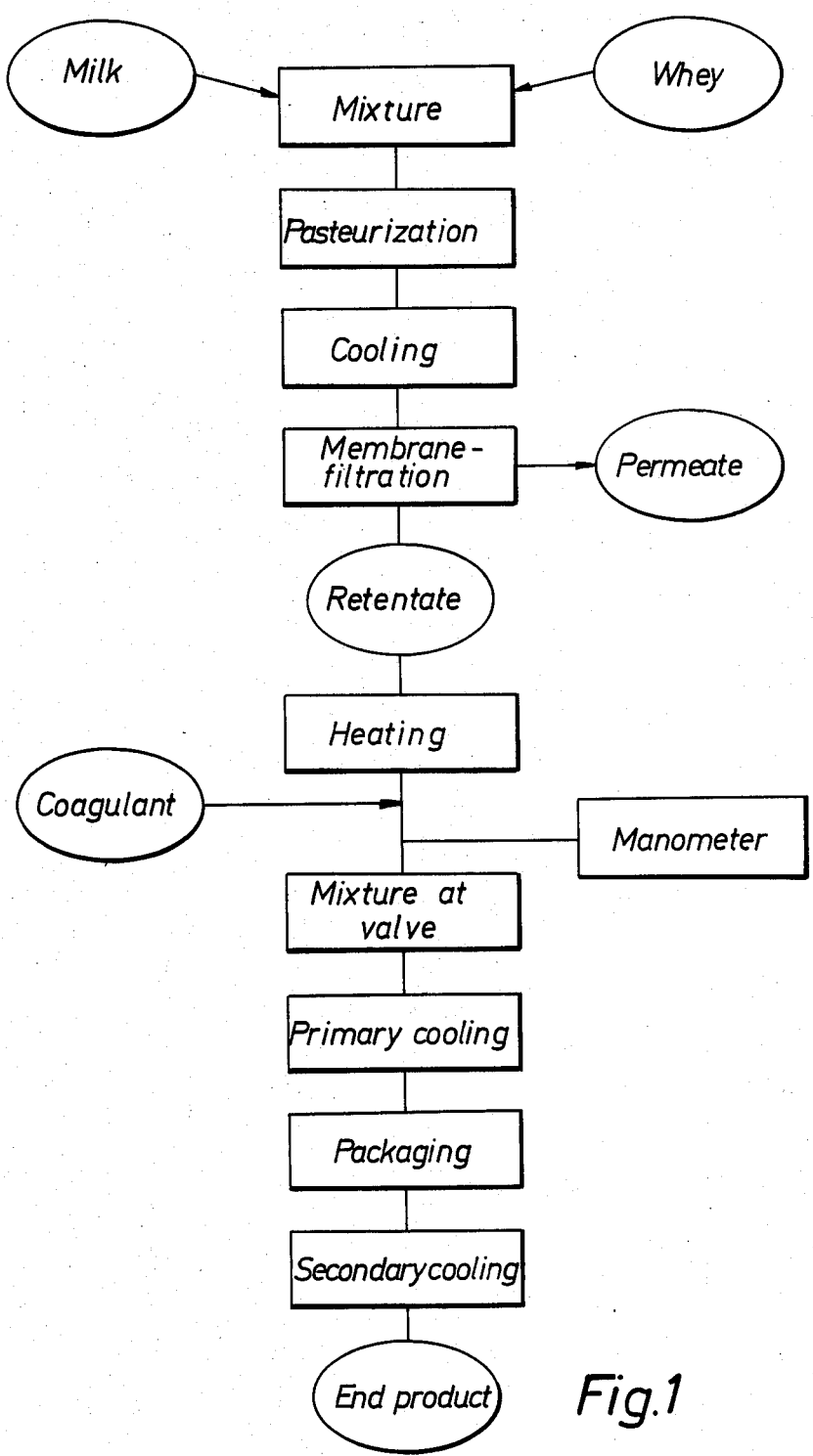
FIG. 1 is a flow sheet of the method according to the invention.

The invention relates to an improved method of producing acid- and heat-coagulated types of cheese. The method comprises subjecting the starting materials to pasteurization, cooling, and filtration through a membrane, thereby forming a retentate, heating the retentate to the precipitation temperature, adding coagulant until the retentate is acidified, and subjecting the retentate to a sudden drop in pressure.

The starting material for the method according to the invention is milk or whey or mixtures thereof as well as any other cheese starting material, including the so-called "cheese-blends", or other cheese precursor.

The starting material is first pasteurized in a conventional manner, usually by heating at a temperature of from about 85° to 90° C., preferably at about 90° C. for a sufficient time to effect pasteurization, e.g., about 15 seconds. The pasteurized mixture is then usually cooled to a temperature in the range of from about 45° to 55° C., preferably to about 50° C. The mixture is then concentrated by membrane filtration, usually and preferably ultrafiltration, to the desired solids content. The resulting retentate has a higher solids content than the content desired in the end product, usually from 1 to 3% by weight higher, and most usually about 2% higher. Thereupon the retentate is heated continuously to the precipitation temperature which is the temperature at which the proteins in the retentate precipitate. The precipitation temperature is usually in the range of from about 50° to 100° C., viz. 80°–90° C. for Ricotta and 50°–60° C. for cottage cheese produced from whole milk.

By the continuously operated process line according to the invention for acidification, coagulant is then admixed under a pressure of from 0.5 to 2.5 bar, especially 1–1.5 bar. The coagulant may be lactic acid, glucono-Δ-lactone (GDL), or conventionally used acid cultures such as Lactobacillus helveticus and Streptococcus thermophilus, as well as mixtures. When using lactic acid, the lactic acid is usually added as an aqueous solution in an acid-water volume/volume ratio of for example 1:3–1:10, especially 1:5. Normally acidification is continued to establish a pH in the range of from about 5.5 to 6.1, preferably from 5.75 to 6.0. Usually from 1.5 to 2% of the lactic acid solution is added. The coagulant is preferably added continuously, and preferably perpendicularly to the product stream, or in a downstream or upstream, but preferably upstream. During these additions and while heating, the mixture is under pressure, e.g., from 0.5 to 2.5 bar as described above. The resulting mixture is then exposed to an abrupt pressure drop to provide a suitable cheese grain formation. It is believed that the drop in pressure over the back-pressure regulator results in a "cavitation" or cavity in the liquid which causes effective mixing of the components. It is known that a "cavitation" occurs in a homogenizer because of a sudden drop in pressure. A similar phenomenon appears to occur here. The drop in pressure is preferably to atmospheric pressure.

It was unexpectedly discovered that a uniform formation of cheese grains is obtained in this invention in the process where heating has been carried out before acidification. It is common knowledge that when a warm retentate is acidified, local acidification takes place exactly where the acid is fed in with a resulting formation of a non-homogenous coagulated product. Accordingly, in prior methods, it was not possible to ensure a uniform acidification, even with vigorous stirring. According to the present invention, by carrying out the precipitation in an opposite sequence as compared to known techniques, i.e., heating before lowering the pH, and combining the acidification step with the subsequent drop in pressure, it is possible to control the texture and structure of the cheese, and to carry out the procedure continuously in a closed system without risk of product waste and by heating only the amount of retentate corresponding to the amount of the final product.

After formation of the cheese grains, the steps of cooling, preferably to 60°–70° C. in about 20 seconds, without any back-pressure, stirring and packaging, and finally secondary cooling, for instance to about 5° to 15° C., preferably about 10° C. during 2–6 hours, preferably 4 hours, are carried out in order to allow the product to absorb the remaining liquid. The product leaving the first cooling apparatus is a non-homogenous mixture of liquid and Ricotta grains. The product is filled into the package under gentle stirring in the funnel of the tapping machine in order to obtain a homogenous mixture of Ricotta grains and liquid in the end packed product.

The method and system according to the invention are illustrated in the accompanying drawing, wherein FIG. 1 is a flow sheet of the method according to the invention. However, as already apparent from the foregoing specification, a number of alterations and variations may be made therein without departing from the spirit and scope of the present invention. It should, however, be emphasized that by the method of the invention, heating must always be carried out before the addition of coagulant and subsequent ventilation.

As will be seen in FIG. 1, the starting mixture is initially formed from milk and/or whey and then pasteurized. Thereafter on cooling, the mixture is filtered through a membrane and the permeate removed. The resulting retentate (about 20–40% solids) is then heated and the coagulant such as aqueous lactic acid, is added. The mixture which is under pressure of about 0.5 to 2.5 bar, as measured by the manometer, is then subjected to a pressure drop as it passes through the valve. Preferably, the pressure drops to atmospheric pressure. The back pressure at this point is as low as possible and may be in the range of about 1.0 to 1.6 bar.

The resulting mixture is then subjected to primary cooling, followed by packaging and secondary cooling to provide the end product.

The invention further relates to a system for carrying out the method according to the invention. The principle of the novel part of the system or apparatus appears from FIG. 2, wherein a pipe 1 is connected to a heat exchanger (not shown). The concentrate leaves the heat exchanger at a temperature corresponding to the precipitation temperature. The coagulant is dosed volumetrically through a nozzle 2. The dosing takes place in the product stream, e.g., perpendicularly thereto, downstream, or upstream, here shown upstream (dosing in perpendicular and downstream directions are shown by dashed lines). A manometer 4 serves to measure the pressure in the pipe. A back-pressure regulator 3 serves to control the product pressure during dosing of the coagulant. The back-pressure regulator, shown only schematically, may for instance be a straightway valve, a seated valve, a needle valve, a fixed replaceable nozzle or diaphragm, or an adjustable nozzle or diaphragm. A heat exchanger 5, shown schematically, e.g., a tubular radiator, cools the retentate, which cooling increases the moisture absorption of the cheese grains.

The invention further comprises an intermediate for the preparation of human food and animal feed. The product resulting from ventilation may be used for incorporation into food and animal feed without being finished by the above temperature treatment and stirring technique, since the product has an excellent nutritive value.

The following examples further illustrate various features of the invention, but are intended in no way to limit the scope of the invention.

EXAMPLES 1 TO 5

Figure 2:
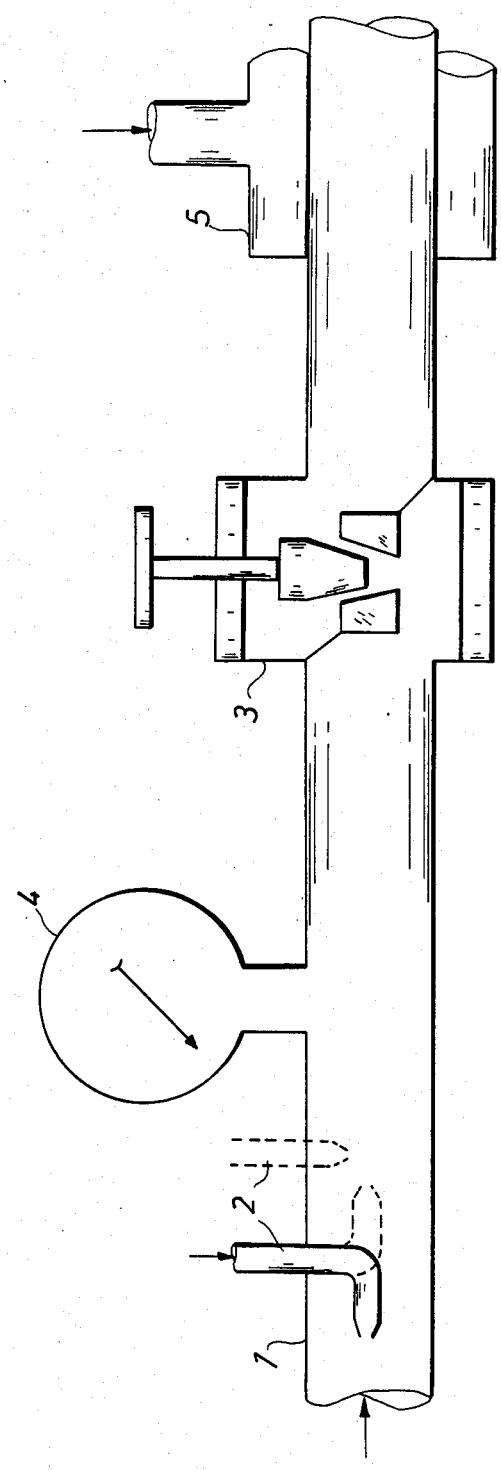
FIG. 2 illustrates part of a system for carrying out the method.

In all the examples, the continuously operated method according to the invention, as set forth in FIG. 1, was carried out by means of the following test set-up comprising an apparatus according to the invention, as set forth in FIG. 2. In the examples and throughout the disclosure, parts are by weight unless otherwise indicated.

TEST SET-UP (APPARATUS)

The starting materials are mixed in an in-line mixer, (Ross in-line mixer), and the pasteurization takes place in a plate heat exchanger followed by cooling in the same plate heat exchanger, ultrafiltration in an ultrafiltration system of the type DDS, UF-module Types 36 and 37, membrane type GR 61 PP, followed by heating in a plate heat exchanger connected to 1½" (38.1 mm) wide by 84 cm long pipe having two bends extending into a 1" (25.4 mm) wide by 19 cm long pipe provided with a ¼" (6.4 mm) dosing stub flattened and bent against the flow of retentate and mounted before a manometer and a 1½" (38.1 mm) straightway valve. Thereafter, follow a 1" (25.4 mm) wide by 1 mm long pipe and a 1" (25.4 mm) wide by 280 cm long pipe provided with a cooling jacket of a 1½" (38.4 mm) wide by 270 cm long pipe using tap water downstream for cooling. The piping arrangement from the straightway valve to the outlet is straight and falls about 1 m. The tapping off of the product is carried out by means of a filling machine of the Trepko type which agitates the product in the funnel of the filling machine, whereafter a secondary cooling takes place in a cooling chamber.

TEST PROCEDURE 2850 l of starting materials (listed in Table I) are pasteurized at 90° C. for 15 seconds, cooled to 50° C., and concentrated by ultrafiltration to form a retentate with a solids content of 30% by weight. The resulting retentate, produced at a rate of about 300 l/h is then heated to the temperature I, (See Table I), in a plate heat exchanger and led through a piping system provided with a dosing stub, for the addition of 1.5 wt. % of coagulant in the form of a 20% by weight of aqueous lactic acid solution to obtain the pH values set forth in Table I. The resulting mixture is then subjected to a pressure drop by passing through the valve.

The back-pressure for each example also appears in Table I. Subsequently, a primary cooling is carried out to temperature II, (See Table I), before the product is packed and subjected to a secondary cooling to 10° C. for at least 4 hours.

TABLE I

| Example No. | Starting Materials | Temp. I °C. | Back-Pressure Bar | pH | Temp. II °C. |
|---|---|---|---|---|---|
| 1 | milk | 85 | 1.5 | 5.86 | 64 |
| 2 | milk | 85 | 1.4 | 5.79 | 67 |
| 3 | milk | 80 | 1.5 | 5.99 | 60 |
| 4 | milk/whey 70:30 vol/vol | 85 | 1.2 | 5.75 | 70 |
| 5 | milk/whey 70:30 vol/vol | 85 | 1.2 | 5.78 | 70 |

The products of examples 1 to 5 were analyzed. The test results appear from the following Table.

TABLE II

| Example No. | Fat % | Solids % | Fat in solids % | Protein % |
|---|---|---|---|---|
| 1 | 9.50 | 20.24 | 46.94 | 10.10 |
| 2 | 13.20 | 28.83 | 45.79 | 11.72 |
| 3 | 4.00 | 22.88 | 17.48 | 12.68 |
| 4 | 12.00 | 29.23 | 41.05 | 11.63 |
| 5 | 12.00 | 29.89 | 40.15 | 11.49 |

Each of the examples gave a very satisfactory product. In organoleptic tests, each product was characterized as being eminent as to texture, appearance, and taste. Thus, the products compare favorably with traditionally produced Ricotta cheese.

What is claimed is:

1. An apparatus for producing acid and heat coagulated cheese from starting materials selected from the group consisting of milk, whey, and mixtures thereof by pasteurizing the starting materials, cooling and filtering the pasteurized materials to produce a retentate, heating the retentate, acidifying the retentate to form a mixture of acid-containing retentate, subjecting the mixture to a sudden pressure drop, cooling the mixture, packaging the mixture to form a packaged product, and subjecting the packaged product to secondary cooling, wherein said apparatus comprises a piping system including dosing means for adding a coagulant to the hot retentate to acidify the retentate and a back pressure regulator adjacent and downstream of said dosing means for causing the sudden drop of pressure to which the mixture of acid-containing retentate is subjected.

2. An apparatus according to claim 1, wherein the back pressure regulator is selected from the group consisting of a straightway valve, a seated valve, a needle valve, a fixed replaceable nozzle, a fixed replaceable diaphragm, an adjustable nozzle and an adjustable diaphragm.

3. An apparatus according to claim 1, wherein the dosing means for the coagulant comprises a flattened dosing stub situated perpendicularly to the product stream flow direction, in a downstream direction or in an upstream direction.

* * * * *